US012645975B2

(12) United States Patent
Fong et al.

(10) Patent No.: US 12,645,975 B2
(45) Date of Patent: Jun. 2, 2026

(54) DYNAMIC QUANTUM COMPUTE INSERTION

(71) Applicant: Dell Products L.P., Round Rock, TX (US)

(72) Inventors: Victor Fong, Medford, MA (US); Orlando Xavier Nieves, Stoughton, MA (US); Kenneth Durazzo, Morgan Hill, CA (US); Dale R. Bremner, Wrentham, MA (US); Benjamin Santaus, Somerville, MA (US)

(73) Assignee: Dell Products L.P., Round Rock, TX (US)

( * ) Notice: Subject to any disclaimer, the term of this patent is extended or adjusted under 35 U.S.C. 154(b) by 1097 days.

(21) Appl. No.: 17/647,374

(22) Filed: Jan. 7, 2022

(65) Prior Publication Data

US 2023/0222376 A1 Jul. 13, 2023

(51) Int. Cl.
| | |
|---|---|
| *G06N 10/80* | (2022.01) |
| *G06N 5/01* | (2023.01) |
| *G06N 10/00* | (2022.01) |
| *G06N 10/60* | (2022.01) |

(52) U.S. Cl.
CPC .............. *G06N 10/80* (2022.01); *G06N 5/01* (2023.01); *G06N 10/00* (2019.01); *G06N 10/60* (2022.01)

(58) Field of Classification Search
None
See application file for complete search history.

(56) References Cited

U.S. PATENT DOCUMENTS

| | | | |
|---|---|---|---|
| 8,818,988 B1 | 8/2014 | Brown et al. | |
| 10,484,479 B2 * | 11/2019 | Johnson .................... | G06F 9/54 |
| 10,997,519 B2 | 5/2021 | Gunnels et al. | |
| 11,550,696 B2 | 1/2023 | Durazzo et al. | |
| 2002/0118700 A1 | 8/2002 | Bruckman | |
| 2015/0286203 A1 | 10/2015 | Stattelmann et al. | |
| 2017/0147303 A1 | 5/2017 | Amy et al. | |
| 2017/0223094 A1 | 8/2017 | Johnson et al. | |
| 2017/0357539 A1 | 12/2017 | Dadashikelayeh et al. | |
| 2018/0096085 A1 | 4/2018 | Rubin | |
| 2018/0240032 A1 | 8/2018 | Van Rooyen | |
| 2018/0293697 A1 | 10/2018 | Ray et al. | |
| 2019/0042677 A1 * | 2/2019 | Matsuura ................ | G06F 17/50 |
| 2020/0104739 A1 | 4/2020 | Sharma et al. | |

(Continued)

FOREIGN PATENT DOCUMENTS

| | | |
|---|---|---|
| WO | 2019/008241 A1 | 1/2019 |
| WO | 2020/081805 A1 | 4/2020 |

OTHER PUBLICATIONS

Weder, Benjamin, Johanna Barzen, Frank Leymann, and Marie Salm. "Automated quantum hardware selection for quantum workflows." Electronics 10, No. 8 (2021): 984. (Year: 2021).*

(Continued)

*Primary Examiner* — Rehana Perveen
*Assistant Examiner* — Kyle H Tseng
(74) *Attorney, Agent, or Firm* — Workman Nydegger

(57) ABSTRACT
One example method includes dynamically selecting a quantum processing unit. During execution of a hybrid application, a quantum execution bundle is processed to identify characteristics that are used to select an optimal quantum processing unit. For each iteration, the optimal quantum processing unit can be dynamically selected and inserted into the execution.

20 Claims, 6 Drawing Sheets

(56)  References Cited

U.S. PATENT DOCUMENTS

| 2020/0142721 | A1 | 5/2020 | Chiba et al. |
| 2020/0159586 | A1 | 5/2020 | Chandramoorthy et al. |
| 2020/0218787 | A1 | 7/2020 | Doi |
| 2021/0406151 | A1 | 12/2021 | Durazzo et al. |
| 2022/0309374 | A1 | 9/2022 | Gonciulea et al. |
| 2022/0327413 | A1 | 10/2022 | Zhang et al. |
| 2023/0020389 | A1 | 1/2023 | Davis et al. |
| 2023/0222372 | A1 | 7/2023 | Fong et al. |

OTHER PUBLICATIONS

Li, Gushu, Anbang Wu, Yunong Shi, Ali Javadi-Abhari, Yufei Ding, and Yuan Xie. "On the co-design of quantum software and hardware." In Proceedings of the Eight Annual ACM International Conference on Nanoscale Computing and Communication, pp. 1-7. 2021. (Year: 2021).*

Salm, Marie, Johanna Barzen, Uwe Breitenbücher, Frank Leymann, Benjamin Weder, and Karoline Wild. "The NISQ analyzer: automating the selection of quantum computers for quantum algorithms." In Symposium and summer school on service-oriented computing, pp. 66-85.) (Year: 2020).*

Scevola, Damiano. "Static Analysis of Resources in QASM: Estimation of the Number of Qubits." 2020. (Year: 2020).*

Perrier, Elija, Dacheng Tao, and Chris Ferrie. "Quantum geometric machine learning for quantum circuits and control." New Journal of Physics 22, No. 10 (2020): 103056. (Year: 2020).*

Saravanan, Vedika, and Samah Mohamed Saeed. "Test data-driven machine learning models for reliable quantum circuit output." In 2021 IEEE European Test Symposium (ETS), pp. 1-6. IEEE, 2021. (Year: 2021).*

Diadamo, S., "Distributed Quantum Computing: A path to large scale quantum computing", Aug. 22, 2021, Medium.com, https://medium.com/@stephen.diadamo/distributed-quantum-computing-1c5d38a34c50 (Year: 2021).

Krupansky, J., "Shots and Circuit Repetitions: Developing the Expectation Value for Results from a Quantum Computer", Jul. 10, 2020, Medium.com, https://jackkrupansky.medium.com/shots-and-circuit-repetitions-developing-the-expectation-value-for-results-from-a-quantum-computer-3d1f8eed398 (Year: 2020).

Niu, S., Todri-Sanial, A., "How Parallel Circuit Execution Can Be Useful for NISQ Computing?", Dec. 2021, Arxiv, https://arxiv.org/pdf/2112.00387 (Year: 2021).

Sundaram, R. G., Gupta, H., Ramakrishnan, C. R., "Efficient Distribution of Quantum Circuits", 2021, 35th International Symposium on Distributed Computing (DISC 2021), Schloss Dagstuhl-Leibniz-Zentrum fur Informatik (Year: 2021).

Utrera, G., Farreras, M., and Fornes, J., "Task Packing: Efficient task scheduling in unbalanced parallel programs to maximize CPU utilization", Dec. 2019, Journal of Parallel and Distributed Computing, vol. 134, pp. 37-49, https://doi.org/10.1016/j.jpdc.2019.08.003 (Year: 2019).

Bisicchia, G., Clemente, G., Garcia-Alonso, J., Rodriguez, J., D'Elia, M., and Brogi, A., "Distributing Quantum Computations, Shot-wise", Nov. 25, 2024, Arxiv, arXiv:2411.16530 (Year: 2024).

Bisicchia, G., Garcia-Alonso, J., Murillo, J., and Brogi, A., "Distributing Quantum Computations by Shots", Nov. 20, 2023, M. (eds) Service-Oriented Computing. ICSOC 2023. Lecture Notes in Computer Science, vol. 14419, pp. 363-377. (Year: 2023).

Bisicchia, G., Garcia-Alonso, Murillo, J., Brogi, A., "Dispatching Shots Among Multiple Quantum Computers: An Architectural Proposal", 2023, 2023 IEEE International Conference on Quantum Computing and Engineering (QCE), pp. 195-198. (Year: 2023).

G. Bisicchia, A. Bocci, J. Garcia-Alonso, J. M. Murillo and A. Brogi, "Cut&Shoot: Cutting & Distributing Quantum Circuits Across Multiple NISQ Computers", 2024, 2024 IEEE (Year: 2024).

Payares, E.D., Martinez-Santos, J.C., "Parallel Quantum Computation Approach for Quantum Deep Learning and Classical-Quantum Models", 2021, Journal of Physics: Conference Series, vol. 2090, Issue 1. (Year: 2021).

* cited by examiner

600

Memory
602

NVRAM
604

Processor
606

Application(s)
614

Storage Media
608

UI Device
610

Data Storage
612

DYNAMIC QUANTUM COMPUTE INSERTION

RELATED APPLICATIONS

This application is related to US application Ser. No. 17/570,845 filed on Jan. 7, 2022, and entitled Parallel Quantum Execution, which application is incorporated by reference in its entirety.

FIELD OF THE INVENTION

Embodiments of the present invention generally relate to quantum computing. More particularly, at least some embodiments of the invention relate to systems, hardware, software, computer-readable media, and methods for dynamically selecting quantum processing units.

BACKGROUND

Over the last few decades, quantum computing has made substantial progress from both software and hardware perspectives. Higher qubit volume is becoming available and as the qubit volume increases, more use cases will be enabled. Even though quantum computing is unlikely at present to be used as a general-purpose central processing unit (CPU), quantum processing units (QPUs) can be used as accelerators and other purposes. Current uses cases relate, for example, to optimization, machine learning and simulation. Advancements in software and hardware will enable more cases, which may be unpredictable.

Quantum processing units can be real or virtual (e.g., simulated). Virtual quantum processing units are available in both the open-source community and via private commercial offerings. However, the runtime characteristics, infrastructure requirements, and licensing models of these virtual quantum processing units vary widely. Similarly, real quantum processing units also have variability in their operation. These differences can complicate the process of selecting the optimal quantum processing unit for a given algorithm.

When performing hybrid classical-quantum processes, a hybrid process may perform many iterations of quantum circuit execution. Throughout each iteration, the quantum circuit and circuit parameters evolve continuously. Thus, the circuit, parameters, runtime characteristics and requirements (e.g., number of qubits, number of quantum gates) may be different throughout the execution of the hybrid process. For example, given a hybrid process with 1024 iterations, the first 100 iterations may have different requirements compared to iterations 100-200. A static quantum computation unit (virtual or real) cannot satisfy the dynamic nature of such hybrid processes. Further, based on different requirements, the associated cost and performance may change. As a result, selecting the optimal configuration in a dynamic model is difficult. The present disclosure provides systems and methods for intelligent hybrid classical systems dynamically select and use quantum processing units.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to quantum computing. More particularly, at least some embodiments of the invention relate to systems, hardware, software, computer-readable media, and methods for dynamically selecting and inserting quantum computation units into hybrid executions. This allows quantum processing units, whether virtual or real, to be selected on-the-fly during execution. Further, quantum processing units can be dynamically selected on a per iteration basis or on other granularity.

In general, example embodiments of the invention relate to mechanisms for dynamically evaluating quantum execution requirements and to dynamically selecting a quantum processing unit based on the execution requirements. In at least some example embodiments, the selected quantum processing unit can be considered the "best" or "optimal" quantum processing unit for a given hybrid application, portion, or iteration thereof. In addition to selecting a quantum processing unit based on execution requirements, embodiments may also select quantum processing units based on programmatically generated metadata, programmatic markers, cost evaluations, and/or performance evaluations.

Embodiments of the invention relate to mechanisms that allow hybrid classical-quantum systems to dynamically select and insert quantum processing units when executing a hybrid process. In other words, quantum processing units, whether real or simulated, can by dynamically selected. Further, a given hybrid application is not limited to using a single quantum processing unit.

Figure 1:
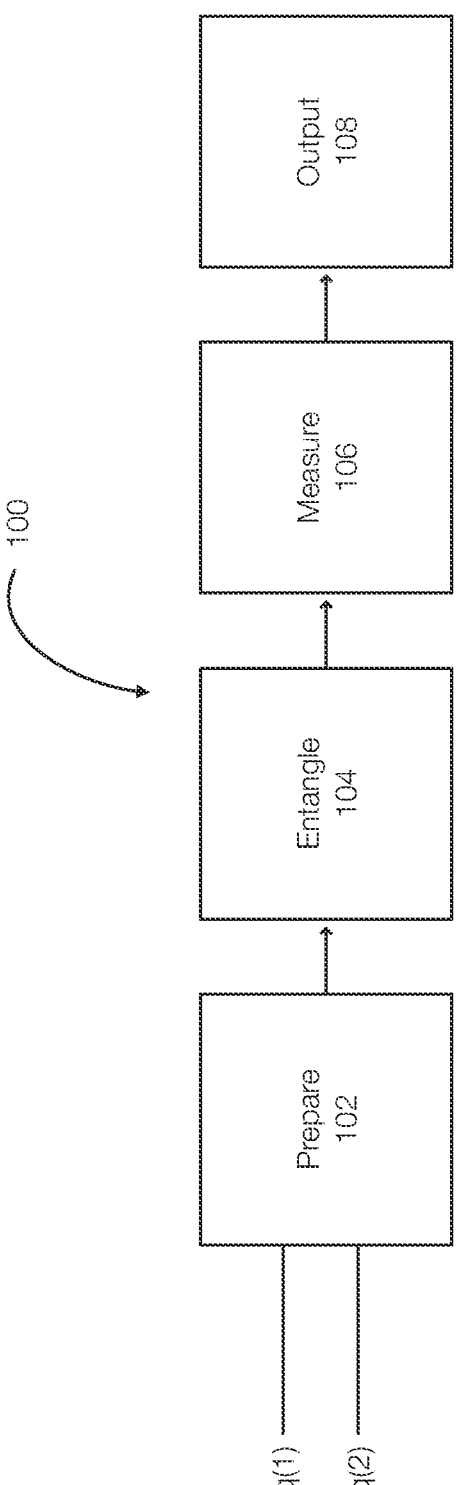
FIG. 1 discloses aspects of a quantum circuit.

FIG. 1 discloses aspects of a quantum circuit. FIG. 1 illustrates an example of a quantum circuit 100. The circuit 100 is provided by way of example only and is not limiting. Generally, the circuit 100 may receive qubits (e.g., q(1) and q(2)) as inputs. The qubits are initialized or prepared 102 to a particular state. Stated differently, the input qubits may be initialized based on parameters. In effect, the parameters can be viewed as the input to the circuit 100.

Once prepared, the circuit 100 can be operated or executed. Operating the circuit 100 a single time is referred to herein as a shot. In this example, the qubits may be entangled 104 (e.g., using quantum gates or the like). The qubits are then measured 106 and recorded as output 108. Because the output 108 of the circuit 100 is probabilistic in nature, a given process may perform a plurality of shots (e.g., hundreds or thousands) for each iteration. The output 108 is returned after all shots have been performed.

The circuit 100 can be implemented in a real quantum processing unit (QPU) or a virtual or simulated quantum processing unit (vQPU). A real QPU may also be referred to herein as a physical QPU. A vQPU is typically implemented in classical hardware, which includes at least a processor, memory, and related hardware components.

Quantum circuits, such as the circuit 100, are typically used for various purposes. Quantum circuits may be used, by way of example only, to perform optimizations, machine learning, simulation, and the like. Hybrid classical-quantum computing benefits from close integration between the classical computing units and the quantum processing units.

More specifically, for an application that performs classical-quantum computing, the classical computing components may generate or identify the quantum circuit and parameters to be executed by the quantum processing unit. After executing the quantum circuits and taking measurements, the classical computer can use a CPU and classic accelerators to determine the next set of quantum circuits and parameters for the quantum processing unit to execute.

Figure 2:
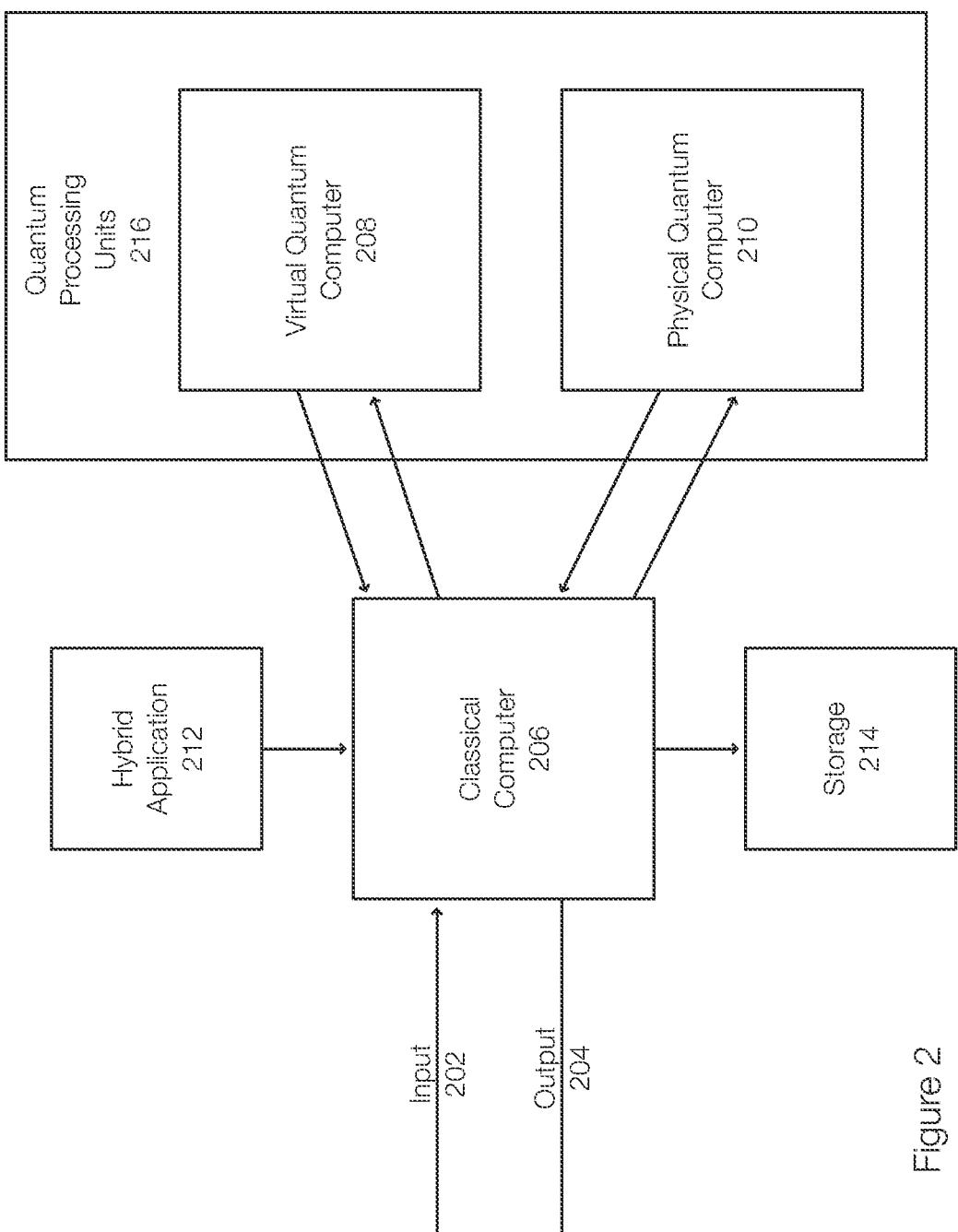
FIG. 2 discloses aspects of a hybrid classical-quantum computing system configured to dynamically select a quantum processing unit.

FIG. 2 discloses aspects of a computing environment that includes classical computing units and quantum processing units and that is configured to perform hybrid classical-quantum computing operations, referred to herein as a hybrid application or a hybrid process. FIG. 2 illustrates a classical computer 206 (an example of a classical computing unit) configured to execute a hybrid application 212. The computer 206 may represent a stand along machine or a computing system including servers. The computer 206 may be implemented in an on-premise system or in the cloud (e.g., a datacenter). The computer 206 thus includes one or more processors, memory, and other circuitry. The computer 206 may also be associated with a storage 214, such as a volume, a storage array, a disk drive, or the like or combination thereof.

The computer 206 may receive input 202 and generate output 204. The input 202 and the output 204 may depend on the application or use-case. For example, the hybrid application 212, which may include classical and/or quantum components or portions, may be configured to train, execute, or optimize a machine learning model, perform cybersecurity, execute financing models, perform artificial intelligence, perform weather forecasting, or the like. The hybrid applications are not limited and embodiments of the invention are not limited to hybrid applications.

FIG. 2 further illustrates a virtual quantum computer 208. The computer 208 is representative of multiple virtual quantum computers. The virtual quantum computer 208 is configured to simulate a real quantum computer using classical hardware such as processors, memory, and the like. The quantum computer 210 is a real quantum computer, e.g., a physical quantum computer, and is representative of multiple quantum computers. The virtual quantum computer 208 and the quantum computer 210 are examples of quantum processing units 216.

More specifically, many different quantum processing units, both real and virtual, are available for hybrid applications. Many are open-source and others are private offerings. However, the runtime characteristics, infrastructure requirements, and licensing models or costs of these quantum processing units vary.

When executing the hybrid application 212, certain processes may be performed in a quantum environment, such as a quantum processing unit. Further, multiple iterations are performed in the selected quantum processing unit 216 at least because the outputs of quantum processing units are probabilistic in nature and often generate a probability distribution.

However, the quantum circuit and circuit parameters used by the hybrid application 212 continuously evolve or change as the iterations are being performed. For example, a hybrid process may require 1024 iterations to be performed by a quantum processing unit. After each iteration, results are returned to the classical computer 206. These results are used to determine the quantum circuit and associated parameters to be used in the next iteration. For example, the first 100 iterations may have different requirements compared to iterations 100-200. As a result, the circuit, parameters, runtime characteristics and requirements (e.g., number of qubits, quantum gates, etc.) may change during the execution of the hybrid application 212. Embodiments of the invention allow a quantum processing unit to be selected for each iteration.

Returning to FIG. 2, the classical computer 206 may determine and predict the runtime characteristics and requirements of a quantum execution bundle. The cost and performance of executing the quantum execution bundle is determined for different types of quantum computers, both real and virtual.

Embodiments of the invention allow specific quantum computers (or quantum processing units) to be selected on a per iteration basis. This allows the quantum processing unit to be selected dynamically during execution of a hybrid application or portion thereof.

If, for a given iteration, the virtual quantum computer 208 is dynamically selected, the iteration is performed and results are returned to the classical computer 206. These results can be used in determining or selecting the quantum processing unit for the next iteration. Similarly, if the quantum computer 210 is selected for a given iteration, the iteration is performed and results are returned to the classical computer 206.

The classical computer 206 uses the results from the quantum computer 208 or 210 to continue executing the hybrid application 212, which may include generating an output 204. However, the results from a current quantum processing unit used by the hybrid application 212 for the current iteration may also be used in selecting the appropriate quantum processing unit for the next iteration. Once all iterations are completed, the output 204 may be generated. The manner in which results from the quantum processing units are used and whether input 202 is received or output 204 is generated is dependent on the specifics of the hybrid application 212 being executed.

Figure 3:
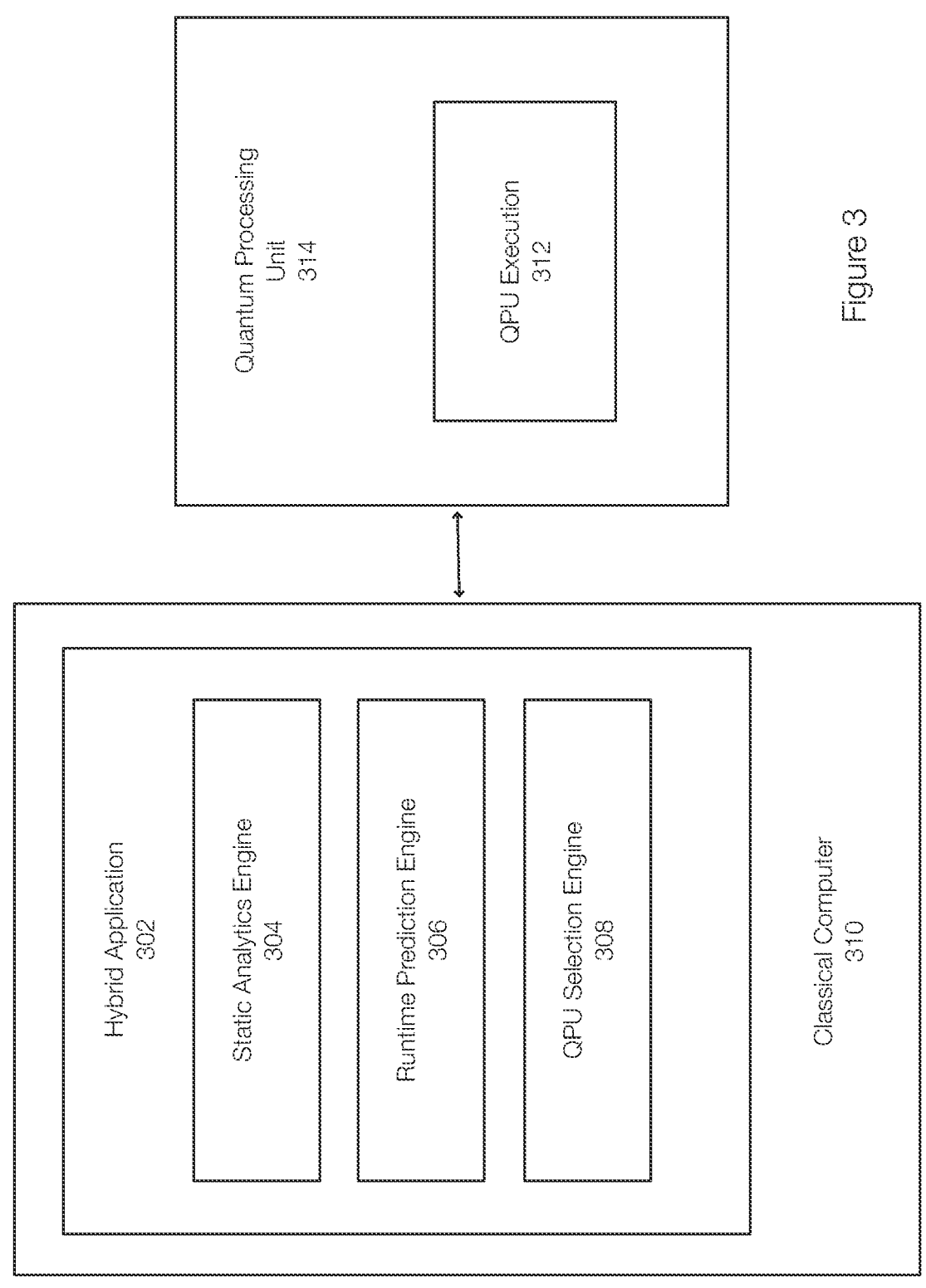
FIG. 3 discloses aspects of selecting a quantum processing unit for executing a hybrid application.

FIG. 3 discloses aspects of dynamically selecting a quantum processing unit. FIG. 3 illustrates a hybrid application 302 executing on a classical computer 310 and illustrates a quantum processing unit 314 that is used for executing quantum aspects of the hybrid application 302.

In this example, the hybrid application 302 may perform a process for selecting a quantum processing unit. In this example, a static analytics engine 304 performs static analytics. The static analytics engine 304 determines the requirements and runtime characteristics for a quantum processing unit. This information may be determined from the quantum execution bundle. Thus, the static analytics engine 304 may determine the number of qubits, the number of shots for the iteration, error correction requirements, gates, depth, and the like for the quantum execution bundle.

Next, the runtime prediction engine 306 may use the information obtained or generated by the static analytics engine 304 to make a prediction based on the historical execution of similar iterations in similar quantum circuits. The runtime prediction engine 306 may include a machine learning model or machine learning models. These models may be configured to predict runtime characteristics for different types of quantum execution environments or quantum circuits such that the runtime characteristics of each quantum execution environment executing the specific quantum execution bundle can be obtained. The static analytics 304 and the runtime prediction 306 may be implemented as microservices.

The output of the runtime prediction engine 306 may include runtime characteristics for each of multiple quantum processing units, including virtual and real quantum processing units. The runtime characteristics predicted by the runtime prediction 306 for each quantum processing unit (virtual and real) may include, as appropriate, one or more of memory required, time required, cost, performance or the like or combination thereof.

The QPU (quantum processing unit) selection engine 308 may then select one of the available quantum processing units based on the output of the runtime prediction engine 306. For some quantum execution bundles, a virtual quantum processing unit may be selected while a real quantum processing unit may be selected for other quantum execution bundles. In this example and for the current iteration, the quantum processing unit 314 may be selected.

Once the quantum processing unit 314 is selected, QPU execution 312 is performed based on the quantum execution bundle. In other words, the iteration, which may include multiple shots using a quantum circuit, is performed and results are determined or measured and returned to the classical computer 310. This process can be repeated as necessary.

Figure 4:
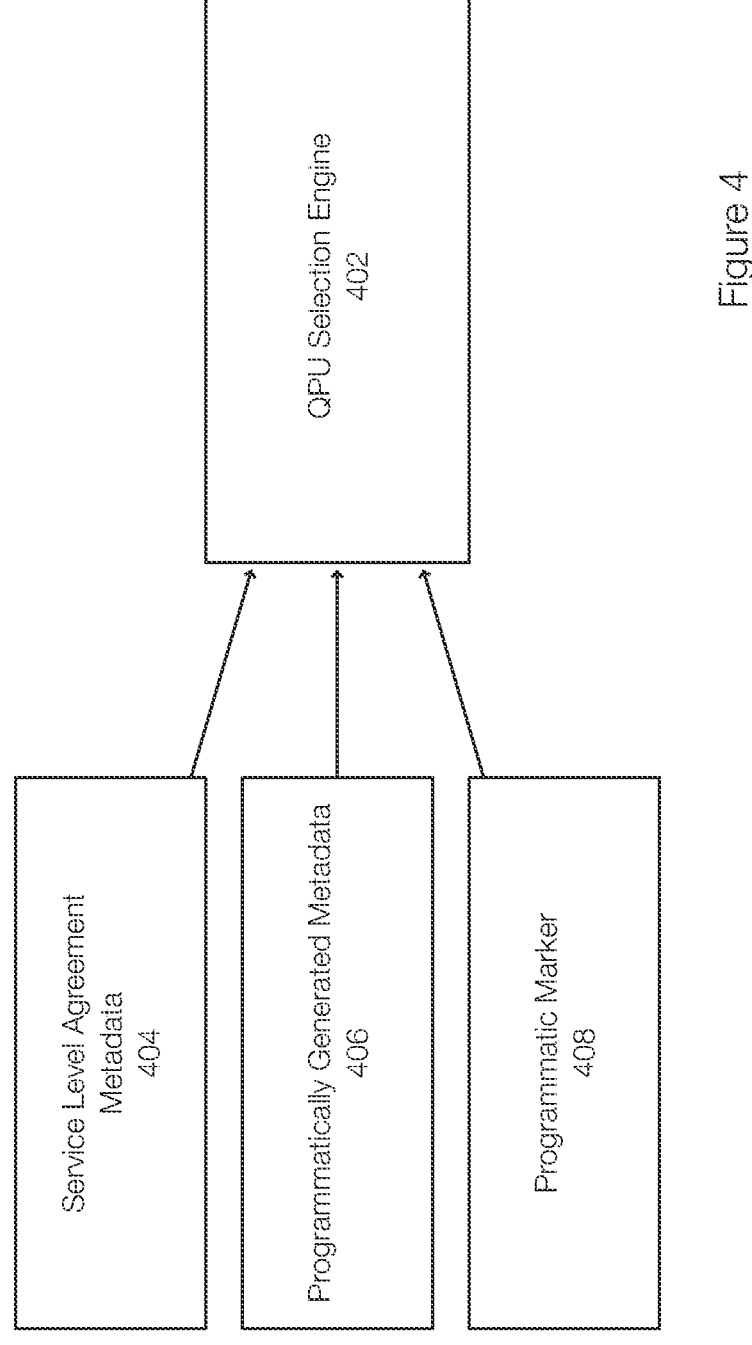
FIG. 4 discloses additional aspects of dynamically selecting a quantum processing unit and of a quantum processing unit selection engine.

FIG. 4 discloses aspects of the QPU selection engine. The QPU selection engine 402, an example of the QPU selection engine 308, may also consider additional mechanisms or insights to select a quantum processing unit. The QPU selection engine 402 may also receive input including a service level agreement metadata 404, programmatically generated metadata 406, and a programmatic marker 408.

The service level agreement metadata 404 allows a user to specify specific execution requirements. These metadata 404 may specify requirements can be specified for each iteration, for multiple iterations, or for the entire process. The metadata 404 may also be specific to a user, to an account, for a time period, or to contract requirements.

Using the insights or predictions for the runtime prediction engine, the QPU selection engine 402 can determine which quantum processing unit appropriately or best satisfies the application or use case. If no quantum processing unit satisfies the use case (e.g., executing 100 circuits on a budget of $1), then the QPU selection engine 402 may select the best possible quantum processing unit or interrupt execution. The metadata 404 may indicate that execution should be interrupted if the user-defined budget is exceeded or would be exceeded.

The actual section of a quantum processing unit may be performed using various mechanisms that may include, but are not limited to, a greedy search, a heuristic search, linear programming, reinforcement learning, or the like. Each of these mechanisms may analyze different runtime characteristics and requirements and each may operate differently. This allows the appropriate mechanism to select the quantum processing unit to be determined.

In some examples, the static analytics engine 304 and the runtime prediction engine 306 may not yield sufficient results to select a quantum processing unit. A developer may program aspects of the classical components to generate additional metadata to better describe the requirements and runtime characteristics of the quantum execution bundle. The programmatically generated metadata 406 can be attached to the quantum execution bundle and used for insight generation and quantum processing unit selection.

A programmatic marker 408 may be inserted into code in the form of comments, macros or annotations to provide additional metadata used in insight generation and quantum processing unit selection.

Figure 5:
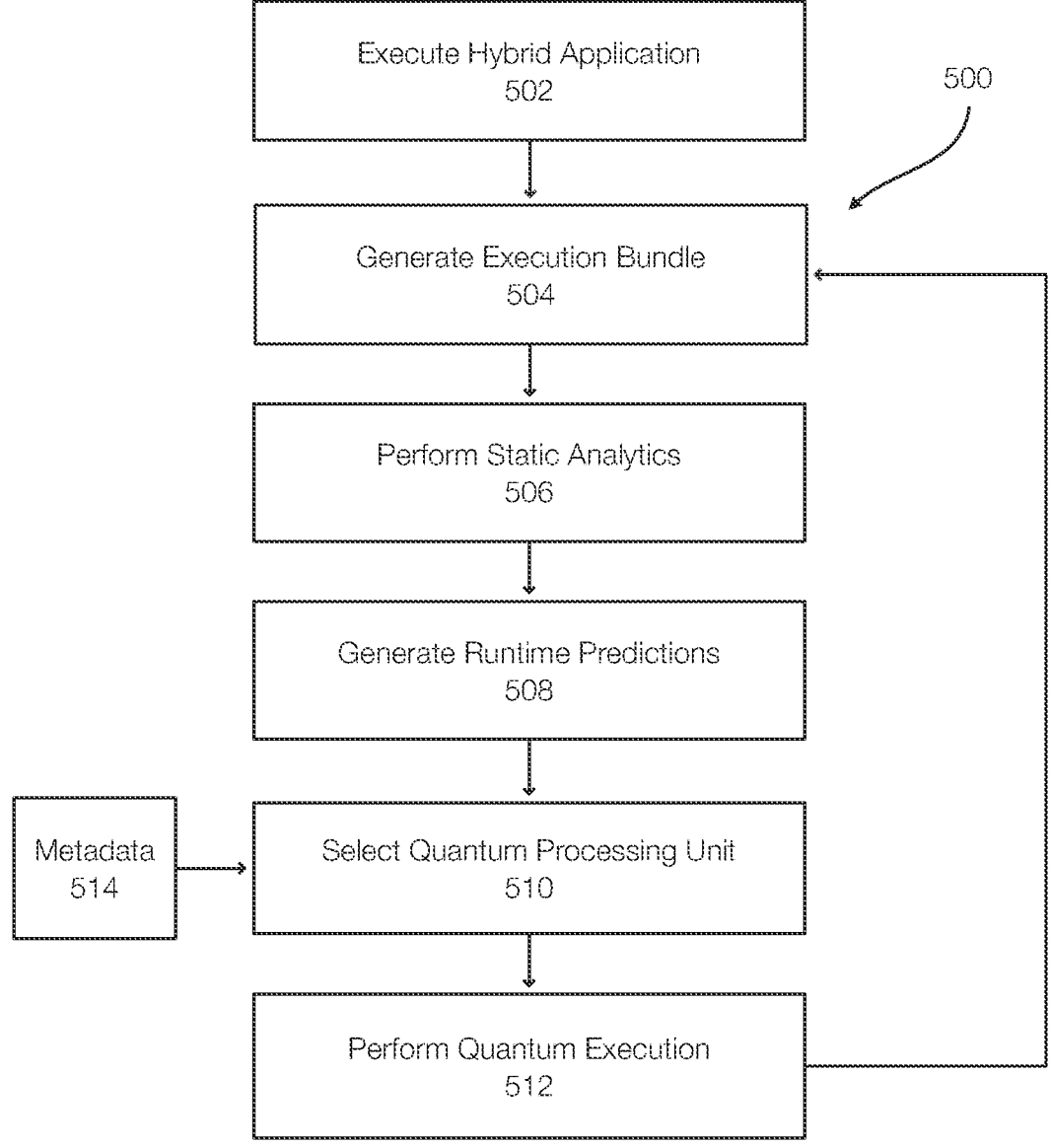
FIG. 5 discloses a flow diagram for dynamically selecting a quantum processing unit.

FIG. 5 discloses aspects of a method for selecting a quantum processing unit. Some elements of the method 500 may be performed repeatedly. Other elements are performed less frequently. Some elements are holistic and describe the application in general. For example, a hybrid system (includes both a classical computing unit and a quantum processing unit) may execute 502 a hybrid application.

During execution of the hybrid application, the need for quantum computing may arise and a quantum execution bundle may be generated 504. Next, static analytics is performed 506. Static analytics may identify the number of qubits, input parameters, an understanding of gates in the quantum circuit, or the like.

The information or metadata generated by the static analytics may be used to generate 508 runtime predictions. Runtime predictions are generated using, in one example, machine learning models. This may include predictions related to memory requirements, execution times, cost, performance, or the like or combination thereof based on the static analytics.

Next, the quantum processing unit for the iteration is selected 510. In addition to the information from the static analysis and the predictions, the selection of the quantum processing unit may also use metadata 514 such as a service level agreement, programmatic markers, and/or programmatically generated metadata.

Once the quantum processing unit is selected, quantum execution is performed 512. Results are returned to the classical computer and, when necessary, the next execution bundle is generated 504. Thus, the process can be repeated for each quantum execution bundle and allows different quantum processing units to be dynamically selected. Accordingly, example embodiments allow for dynamic selection of the best or optimal quantum execution environment throughout the lifecycle of a hybrid classical-quantum process. Dynamic selection of the best or optimal quantum execution environment can be based on, e.g., the static analysis and predictions described earlier.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, hybrid operations or applications including classical-quantum algorithms or processes.

New and/or modified data collected and/or generated in connection with some embodiments, may be stored in an environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data or processing functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), containers or microservices.

Particularly, devices in the operating environment may take the form of software, physical machines, VMs, containers, microservices, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: generating a quantum execution bundle by a hybrid application operating in a classical computer, performing a static analysis on the quantum execution bundle to determine information about the quantum execution bundle, generating runtime predictions using the information, and selecting a quantum processing unit based at least on the predictions, wherein the quantum processing unit is selected dynamically.

Embodiment 2. The method of embodiment 1, further comprising dynamically selecting a quantum processing unit for each iteration of a hybrid process performed in the quantum processing unit.

Embodiment 3. The method of embodiment 1 and/or 2, further comprising selecting the quantum processing unit from among a plurality of virtual quantum processing units or selecting the quantum processing unit from amount a plurality of real quantum processing units, wherein the predictions determine whether the quantum processing unit should be a virtual quantum processing unit or a real quantum processing unit.

Embodiment 4. The method of embodiment 1, 2, and/or 3, further comprising selecting the quantum processing by performing a greedy search.

Embodiment 5. The method of embodiment 1, 2, 3, and/or 4, further comprising selecting the quantum processing by performing a heuristic search.

Embodiment 6. The method of embodiment 1, 2, 3, 4, and/or 5, further comprising selecting the quantum processing by performing linear programming.

Embodiment 7. The method of embodiment 1, 2, 3, 4, 5, and/or 6, further comprising selecting the quantum processing by performing reinforcement learning.

Embodiment 8. The method of embodiment 1, 2, 3, 4, 5, 6, and/or 7, wherein the information includes one or more of a number of qubits, input parameters, data regarding gates in a quantum circuit.

Embodiment 9. The method of embodiment 1, 2, 3, 4, 5, 6, 7, and/or 8, wherein the predictions include one or more of required memory, time required, cost, or a performance.

Embodiment 10. The method of embodiment 1, 2, 3, 4, 5, 6, 7, 8, and/or 9, wherein predictions are generated for each of a plurality of quantum processing units, which include virtual quantum processing units and real quantum processing units.

Embodiment 11. The method of embodiment 1, 2, 3, 4, 5, 6, 7, 8, 9, and/or 10, further comprising selecting the quantum processing unit based on at least one of a service level agreement, programmatically generated metadata, or a programmatic marker.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the dis-closed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in lan-guage specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be imple-mented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is pro-vided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
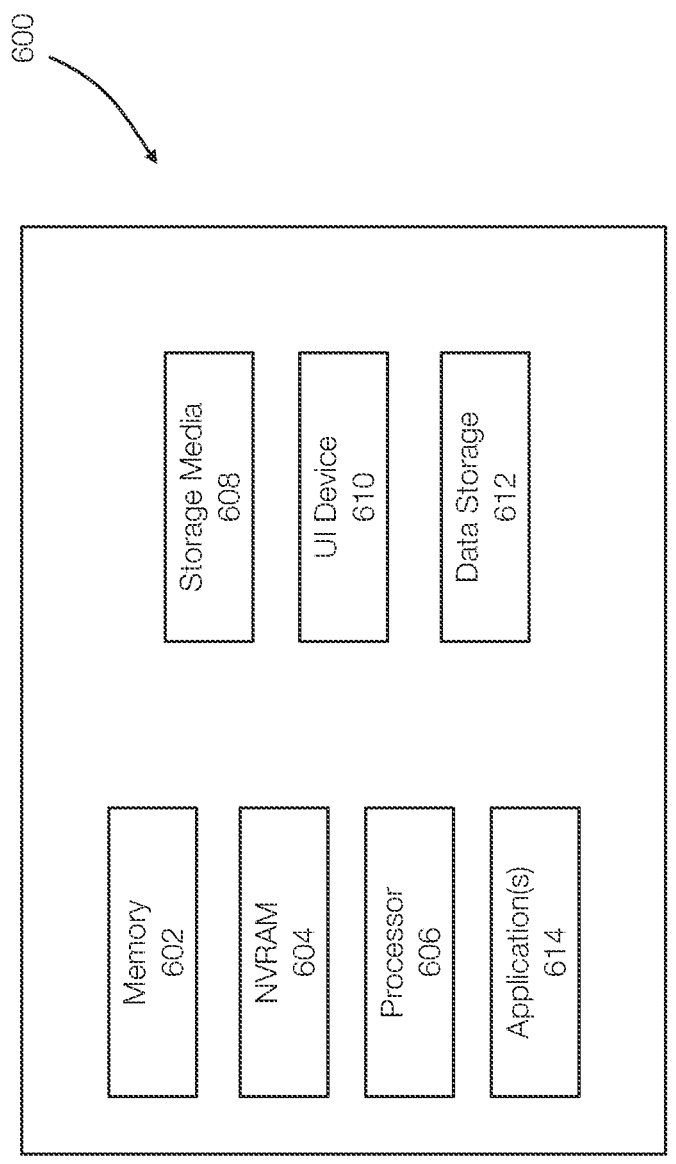
FIG. 6 discloses aspects of a computing device or a computing system.

With reference briefly now to FIG. 6, any one or more of the entities disclosed, or implied, by the Figures and/or elsewhere herein, may take the form of, or include, or be implemented on, or hosted by, a physical computing device or a physical quantum device, one example of which is denoted at 600.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential charac-teristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

executing a hybrid application in a classical computing system that includes processors and memory, wherein the hybrid application includes a classical portion per-formed in the classical computing system and a quan-tum portion;

executing the classical portion in the classical computing system, which includes generating a quantum execu-tion bundle representing a quantum portion of the hybrid application during execution of the hybrid appli-cation in the classical computing system;

performing, prior to any quantum or simulated quantum execution of the quantum portion, a static analysis on the quantum execution bundle to determine informa-tion about the quantum execution bundle, wherein the static analysis comprises code- and circuit-level inspec-tion without numerically simulating quantum evolu-tion, the information including a quantum circuit, num-ber of qubits of the quantum circuit, gates, and depth;

generating runtime predictions using a machine learning model trained on historical execution data obtained from execution of quantum circuits on a plurality of physical and virtual processing units, the model receiv-ing the information as input and outputting, for each available quantum processing unit, the runtime predictions including an execution time and a cost for executing the quantum portion of the hybrid application; and
selecting a quantum processing unit from among a plurality of quantum processing units based on the runtime predictions, a current iteration state of the hybrid application, and service level agreement constraints that define quantitative performance and cost thresholds for execution of the quantum portion, wherein the quantum processing unit is selected dynamically for each iteration during execution of the hybrid application, and wherein the selection is adjusted or re-performed if the predicted cost or execution time would violate the service level agreement constraints.

2. The method of claim 1, further comprising dynamically selecting a quantum processing unit for each iteration of a hybrid process performed in the quantum processing unit.

3. The method of claim 2, further comprising selecting the quantum processing unit from among a plurality of virtual quantum processing units or selecting the quantum processing unit from among a plurality of real quantum processing units, wherein the runtime predictions determine whether the quantum processing unit should be a virtual quantum processing unit or a real quantum processing unit.

4. The method of claim 1, further comprising selecting the quantum processing unit by performing a greedy search.

5. The method of claim 1, further comprising selecting the quantum processing unit by performing a heuristic search.

6. The method of claim 1, further comprising selecting the quantum processing unit by performing linear programming.

7. The method of claim 1, further comprising selecting the quantum processing unit by performing reinforcement learning.

8. The method of claim 1, wherein the information includes one or more of a number of qubits, input parameters, data regarding gates in a quantum circuit.

9. The method of claim 1, wherein the runtime predictions include one or more of required memory or a performance.

10. The method of claim 9, wherein predictions are generated for each of a plurality of quantum processing units, which include virtual quantum processing units and real quantum processing units.

11. The method of claim 1, further comprising selecting the quantum processing unit based on at least one of a service level agreement, programmatically generated metadata, or a programmatic marker.

12. A non-transitory storage medium having stored therein instructions that are executable by one or more hardware processors to perform operations comprising:
executing a hybrid application in a classical computing system that includes processors and memory, wherein the hybrid application includes a classical portion performed in the classical computing system and a quantum portion;
executing the classical portion in the classical computing system, which includes generating a quantum execution bundle representing a quantum portion of the hybrid application during execution of the hybrid application in the classical computing system;
performing, prior to any quantum or simulated quantum execution of the quantum portion, a static analysis on the quantum execution bundle to determine information about the quantum execution bundle, wherein the static analysis comprises code- and circuit-level inspection without numerically simulating quantum evolution, the information including a quantum circuit, number of qubits of the quantum circuit, gates, and depth;
generating runtime predictions using a machine learning model trained on historical execution data obtained from execution of quantum circuits on a plurality of physical and virtual processing units, the model receiving the information as input and outputting, for each available quantum processing unit, the runtime predictions including an execution time and a cost for executing the quantum portion of the hybrid application; and
selecting a quantum processing unit from among a plurality of quantum processing units based on the runtime predictions, a current iteration state of the hybrid application, and service level agreement constraints that define quantitative performance and cost thresholds for execution of the quantum portion, wherein the quantum processing unit is selected dynamically for each iteration during execution of the hybrid application, and wherein the selection is adjusted or re-performed if the predicted cost or execution time would violate the service level agreement constraints.

13. The non-transitory storage medium of claim 12, further comprising dynamically selecting a quantum processing unit for each iteration of a hybrid process performed in the quantum processing unit.

14. The non-transitory storage medium of claim 13, further comprising selecting the quantum processing unit from among a plurality of virtual quantum processing units or selecting the quantum processing unit from among a plurality of real quantum processing units, wherein the runtime predictions determine whether the quantum processing unit should be a virtual quantum processing unit or a real quantum processing unit.

15. The non-transitory storage medium of claim 12, further comprising selecting the quantum processing unit by performing a greedy search, a heuristic search, linear programming or reinforcement learning.

16. The non-transitory storage medium of claim 12, wherein the information includes one or more of a number of qubits, input parameters, data regarding gates in a quantum circuit.

17. The non-transitory storage medium of claim 12, wherein the runtime predictions include one or more of required memory, or a performance.

18. The non-transitory storage medium of claim 17, wherein predictions are generated for each of a plurality of quantum processing units, which include virtual quantum processing units and real quantum processing units.

19. The non-transitory storage medium of claim 12, further comprising selecting the quantum processing unit based on at least one of a service level agreement, programmatically generated metadata, or a programmatic marker.

20. The non-transitory storage medium of claim 19, wherein, if the service level agreement is selected, the service level agreement specifies cost and performance for each iteration and for overall algorithm execution, wherein, if the programmatic marker is selected, the programmatic marker is inserted into code of the hybrid application, wherein, if the programmatically generated metadata is selected, the programmatically generated metadata describes requirements and runtime characteristics of the quantum execution bundle.

* * * * *